United States Patent Office 3,520,308
Patented July 14, 1970

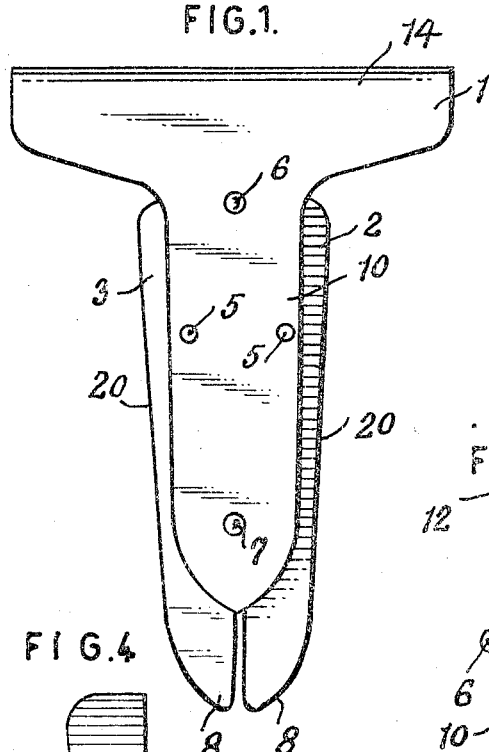
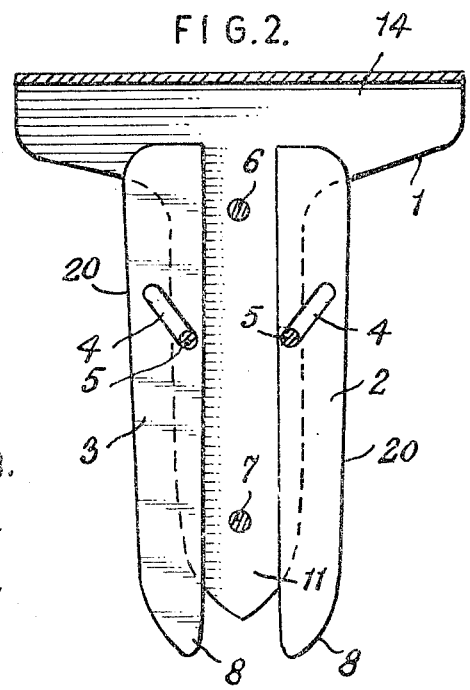
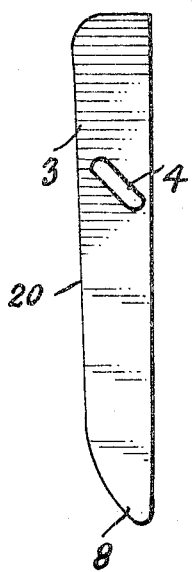
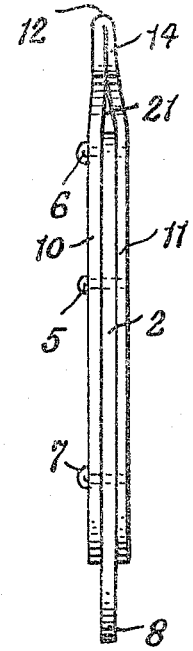
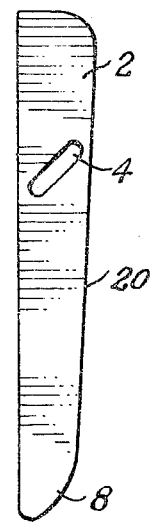
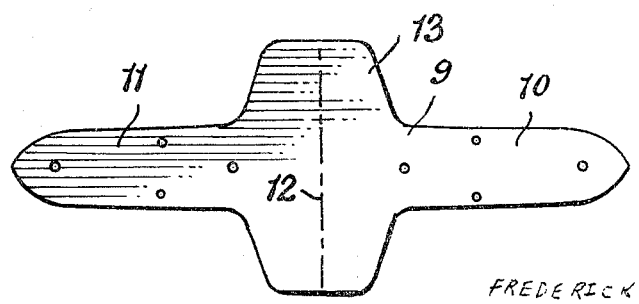

3,520,308
PIPE REAMER
Frederick A. Fassbender, Essex Fells, N.J., assignor to S. M. Frank & Co., Inc., New York, N.Y., a corporation of New York
Filed June 17, 1968, Ser. No. 737,542
Int. Cl. A24f 9/10
U.S. Cl. 131—246         2 Claims

ABSTRACT OF THE DISCLOSURE

A reamer for smokers' pipes having a handle or blade holder, the handle being of substantially T-shape and being formed from a single strip or blank. In forming the handle, the strip is doubled transversely upon itself to provide spaced sections including tabs that are riveted together and hold a pair of slidable scraping blades between the tabs. Rivets extend between the tabs to hold them spaced apart and other rivets also extend between the tabs and pass through angular or inclined slots in the blades. This pin-and-slot connection between the blades and the holder or handle enables the blades to separate or spread apart to a required extent to enable them to contact the inner wall surface of a pipe bowl and scrape the same when the reamer is rotated.

SUMMARY OF THE INVENTION

The invention relates to a reamer for smokers' pipes and has a T-shaped handle formed from a single piece of metal folded on itself to provide a finger-engaging part having extensions forming tabs between which a pair of flat blades is slidably mounted on pins or rivets extending through the layers of the handle, the handle constituting a blade holder. The blades are disposed in the handle in side-by-side relation and are arranged, when the device is inserted within a pipe bowl preparatory to reaming out the same, to spread apart or separate to a degree required to bring the respective outer scraping edges of the blades into contact with the inner wall surface of the pipe bowl. When the reamer is manually rotated, the outer edges of the blades will scrapingly engage against the inner surface of the pipe bowl and ream it out.

DESCRIPTION

In the accompanying drawing wherein an illustrative embodiment of the invention is disclosed, FIG. 1 is an elevational view of a pipe reamer constructed in accordance with the invention;

FIG. 2 is a similar view, but showing a portion of the handle or blade holder in section and showing the scraper blades in their spread apart or distended position;

FIG. 3 is an edge view of the reamer;

FIG. 4 is an elevational view of one of the scraper blades;

FIG. 5 is a similar view of the second scraper blade, and

FIG. 6 is an elevational view of the blank from which the handle or blade holder is made, shown in a reduced scale.

The reamer as disclosed, is composed of three main parts namely, the handle portion or blade holder generally indicated at 1, and the two flat slidable scraper blades indicated respectively at 2 and 3. The handle portion or blade holder is preferably but not necessarily made of sheet metal or from a suitable plastic material, and the blank or strip from which it is formed is shown at 9 in FIG. 6. It will be there seen that the blank is in the form of a flat, elongated strip that has a relatively wide central area 13 from which projects a pair of oppositely-directed integral tabs or tongues indicated respectively at 10 and 11.

The handle portion or blade holder 1 is formed from the blank 9 by folding or bending the blank transversely and centrally on the dotted line 12, which doubles the area 13 on itself and brings the tab portions 10 and 11 into overlying but spaced-apart relation, providing sufficient spacing between them for the slidable accommodation of the two flat metal scraper blades shown respectively at 2 and 3. The result is a T-shaped body having a handle portion 14 at the top and the two tabs 10 and 11 receiving the scraper blades 2 and 3 between them as clearly seen in FIGS. 1 and 2. The width of the tabs 10 and 11 is such that while they strongly reinforce the blades 2 and 3, the scraping edges of the blades shown at 20, always project beyond the side edges of the tabs and this regardless of whether the blades are drawn togeher as in FIG. 1, or are separated as in FIG. 2. In the handle area of the holder, the parts thereof are slightly brought together as at 21 to confine the blades. As seen in the upper portion of FIG. 3, the parts shown at 21 provide a space which is insufficient to permit the upper ends of the blades as illustrated, to slide thereinto, thereby limiting the longitudinal sliding movement of the blades with respect to the handle.

The tabs 10 and 11 receive spacing rivets 6 and 7 which hold the tabs in their required spaced relation. The scraper blades 2 and 3 are each provided with an inclined slot 4 engaged by rivets 5 which extend between the tabs 10 and 11. The blades 2 and 3 are slidable on the rivets 5 and are guided by the rivets 6 and 7 in their sliding movements. The blades are each provided with tapered nose portions 8 to facilitate the entry of the blades into the pipe bowl.

In the advanced and closed position of the blades, as shown in FIG. 1, the device is inserted into the bowl of a pipe that is to be reamed or scraped. When it is pushed into the bowl, the rounded ends 8 of the blades 2 and 3 will come into contact with the bottom of the bowl and upon further downward movement of the reamer the blades will begin to spread apart or separate toward the position shown in FIG. 2, wherein the blades are shown in the position of greatest separation since then the rivets will have reached the inner ends of the inclined slots 4. The blades separate in this manner to the extent required until their cutting edges 20 establish contact with the inner wall surface of the bowl of the pipe. Then by applying slight downward pressure and a rotative movement to the handle 14, the blades will ream out the interior of the bowl, with the blades separating or spreading apart to the extent required to meet the increase in diameter of the bowl as it is reamed out.

The device is of simple and sturdy construction. The blades are strongly reinforced by the overlying tabs 10 and 11 of the blade holder, and as a result a long useful life and efficient operation is obtained from the device.

What is claimed is:

1. A pipe reamer comprising, a T-shaped blade holder consisting of a double-over strip including overlying and spaced apart tab portions and a two-ply handle portion, a pair of mutually spaced flat blades slidably mounted between the tab portions, rivets extending through the tab portions at points between the blades for maintaining the tab portions in spaced relation to permit the sliding movement of the blades between them, the blades having inclined slots, pins extending through the tab portions and through the angular slots, the blades being coplanar and slidable longitudinally of the reamer and to or from one another on the pins, the plies of the handle portion being directed toward each other to an extent to limit the longitudinal movement of the blades when they spread apart under pressure imposed on them when they are inserted in a pipe bowl.

2. A pipe reamer comprising, a blade holder of substantially T-shape and consisting of a folded strip including tabs between which a channel is located, the holder including a two-ply handle portion at its top, the plies thereof being in contact to form stops for blades slidable in the channel, a pair of similarly shaped blades constantly disposed in separated relationship, each blade having a single angular slot, a single pin for each blade, such pins extending through the respective slots and through the tabs, the blades being coplanar and movable longitudinally of the reamer to or from one another and being limited in longitudinal movement by the plies of the handle portion when the reamer is inserted into a pipe bowl.

References Cited

UNITED STATES PATENTS

| | | | |
|---|---|---|---|
| 1,807,576 | 5/1931 | Krekeler | 131—246 |
| 2,149,209 | 2/1939 | Brinnon et al. | 131—246 |
| 2,438,678 | 3/1948 | Palmer | 131—246 |

FOREIGN PATENTS

| | | |
|---|---|---|
| 21,578 | 1895 | Great Britain. |
| 22,163 | 1895 | Great Britain. |
| 201,771 | 8/1923 | Great Britain. |

JOSEPH S. REICH, Primary Examiner